US012632605B2

(12) United States Patent
Ishida

(10) Patent No.: US 12,632,605 B2
(45) Date of Patent: May 19, 2026

(54) INFORMATION PROCESSING APPARATUS, INFORMATION PROCESSING METHOD, AND STORAGE MEDIUM

(71) Applicant: NEC Corporation, Tokyo (JP)

(72) Inventor: Katsuhiko Ishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 205 days.

(21) Appl. No.: 18/662,112

(22) Filed: May 13, 2024

(65) Prior Publication Data

US 2024/0394415 A1     Nov. 28, 2024

(30) Foreign Application Priority Data

May 25, 2023     (JP) ................................. 2023-085959

(51) Int. Cl.
| | |
|---|---|
| *G06F 21/64* | (2013.01) |
| *G06F 21/31* | (2013.01) |
| *G06F 21/62* | (2013.01) |
| *H04L 9/00* | (2022.01) |
| *H04L 9/32* | (2006.01) |

(52) U.S. Cl.
CPC .............. *G06F 21/64* (2013.01); *G06F 21/31* (2013.01); *G06F 21/62* (2013.01); *G06F 2221/21* (2013.01); *H04L 9/32* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2010/0250553 A1* | 9/2010 | Higuchi | .................. | G06F 16/51 |
| | | | | 707/748 |
| 2014/0286581 A1* | 9/2014 | Horiuchi | ............... | G06F 3/0481 |
| | | | | 382/224 |
| 2022/0309489 A1* | 9/2022 | Kahn | .................. | G06Q 30/0206 |
| 2022/0318890 A1* | 10/2022 | Uchimura | .............. | G06Q 30/02 |
| 2022/0368994 A1* | 11/2022 | Chu | .................... | H04N 21/4826 |
| 2023/0108366 A1* | 4/2023 | Tang | .................. | G06Q 20/3829 |
| | | | | 705/66 |
| 2023/0421377 A1* | 12/2023 | Jakobsson | ................. | H04L 9/50 |

(Continued)

FOREIGN PATENT DOCUMENTS

| | | | | |
|---|---|---|---|---|
| JP | 6982352 B1 | | 12/2021 | |
| KR | 102473540 B1 | * | 12/2022 | ......... G06Q 10/0631 |

*Primary Examiner* — Ali H. Cheema
(74) *Attorney, Agent, or Firm* — Sughrue Mion, PLLC

(57) ABSTRACT

Method, apparatus and computer-readable storage medium for information processing is described herein. In an implementation, the method comprising step(s) of: accepting provided data from one or more external terminals; performing preset preprocessing on the provided data, assigning an NFT (Non-Fungible Token) to the preprocessed provided data, and registering the preprocessed provided data; calculating a degree of association of each of a plurality of provided data in generated data generated using the plurality of provided data; and assigning a new NFT to the generated data and registering the generated data. In some implementations, the method further comprising the step(s) of calculating a new degree of association based on an evaluation value of the provided data corresponding to a preset characteristic of the provided data and the degree of association.

11 Claims, 7 Drawing Sheets

(56)                    References Cited

U.S. PATENT DOCUMENTS

| | | | |
|---|---|---|---|
| 2024/0281779 A1* | 8/2024 | Richter | G06Q 20/1235 |
| 2024/0305482 A1* | 9/2024 | Patt | G06F 16/134 |
| 2024/0420124 A1* | 12/2024 | Ramde | G06Q 20/3674 |
| 2025/0016011 A1* | 1/2025 | Hamiel | H04L 9/3255 |

* cited by examiner

INFORMATION PROCESSING APPARATUS

100

CPU 101

RAM 103

BUS 109

STORAGE DEVICE 105

PROGRAMS 104

INPUT/OUTPUT INTERFACE 108

ROM 102

COMMUNICATION INTERFACE 107

DRIVE DEVICE 106

110

111

INFORMATION PROCESSING APPARATUS, INFORMATION PROCESSING METHOD, AND STORAGE MEDIUM

INCORPORATION BY REFERENCE

This application is based upon and claims the benefit of priority from Japanese patent application No. 2023-085959, filed on May 25, 2023, the disclosure of which is incorporated herein in its entirety by reference.

TECHNICAL FIELD

The present disclosure relates to an information processing apparatus, an information processing method, and a program.

BACKGROUND ART

The use of an NFT (Non-Fungible Token) ensures the authenticity and uniqueness of data, and realizes a system for distributing data while guaranteeing the value of the data. For example, Patent Literature 1 describes distributing shares of data traded using NFTs.

Patent Literature 1: Japanese Patent Publication No. 6982352

However, since even data assigned an NFT can be copied, the data can be used by others. For this reason, it is difficult to return an appropriate reward for data provision to a provider who has provided the data used by others. As a result, a problem arises that data distribution cannot be promoted and the effective use of data cannot be contemplated.

SUMMARY OF THE INVENTION

Accordingly, an object of the present disclosure is to solve the abovementioned problem that the effective use of data cannot be contemplated.

An information processing apparatus as an aspect of the present disclosure includes:

a provided data registering unit that registers provided data assigned an NFT (Non-Fungible Token);

a calculating unit that calculates a degree of association of each of a plurality of provided data in generated data generated using the plurality of provided data; and a generated data registering unit that assigns an NFT to the generated data and registers.

Further, an information processing method as an aspect of the present disclosure includes: registering provided data assigned an NFT (Non-Fungible Token); calculating a degree of association of each of a plurality of provided data in generated data generated using the plurality of provided data; and assigning an NFT to the generated data and registering.

Further, a program as an aspect of the present disclosure includes instructions for causing a computer to realize processes to: register provided data assigned an NFT (Non-Fungible Token); calculate a degree of association of each of a plurality of provided data in generated data generated using the plurality of provided data; and assign an NFT to the generated data and register.

With the configurations as described above, the present disclosure enables contemplation of the effective use of data.

EXAMPLE EMBODIMENT

First Example Embodiment

Figure 1:
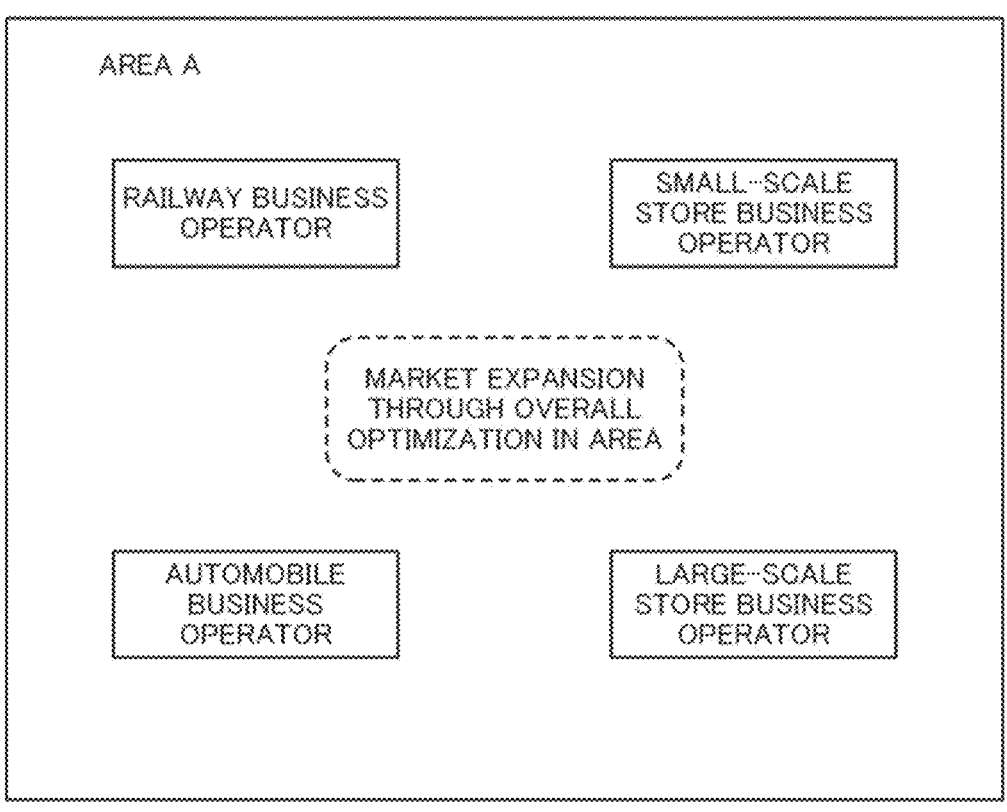
FIG. 1 is a view showing the association of business operators related to an information processing system according to the present disclosure.
Figure 2:
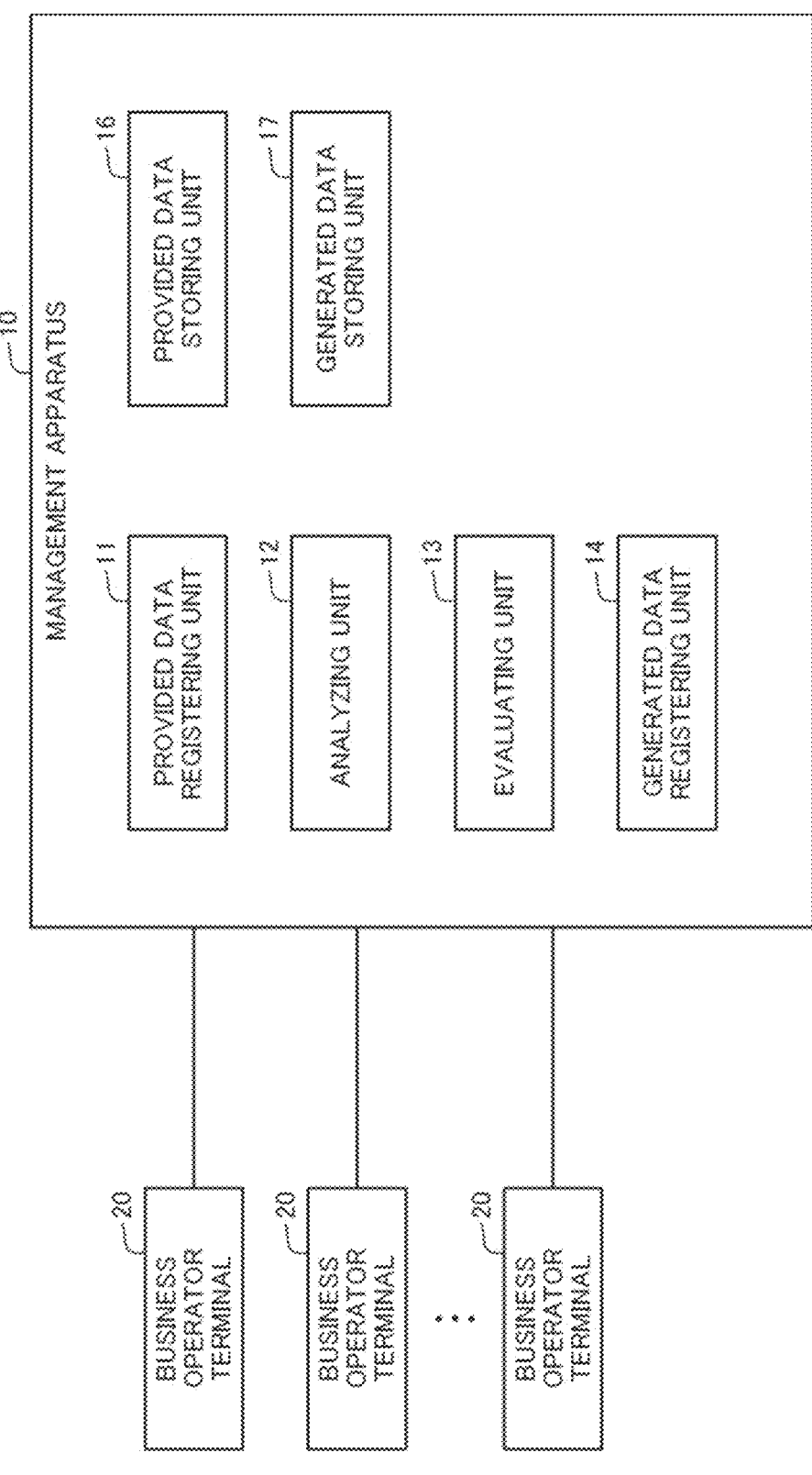
FIG. 2 is a block diagram showing the configuration of the information processing system according to the present disclosure.
Figure 3:
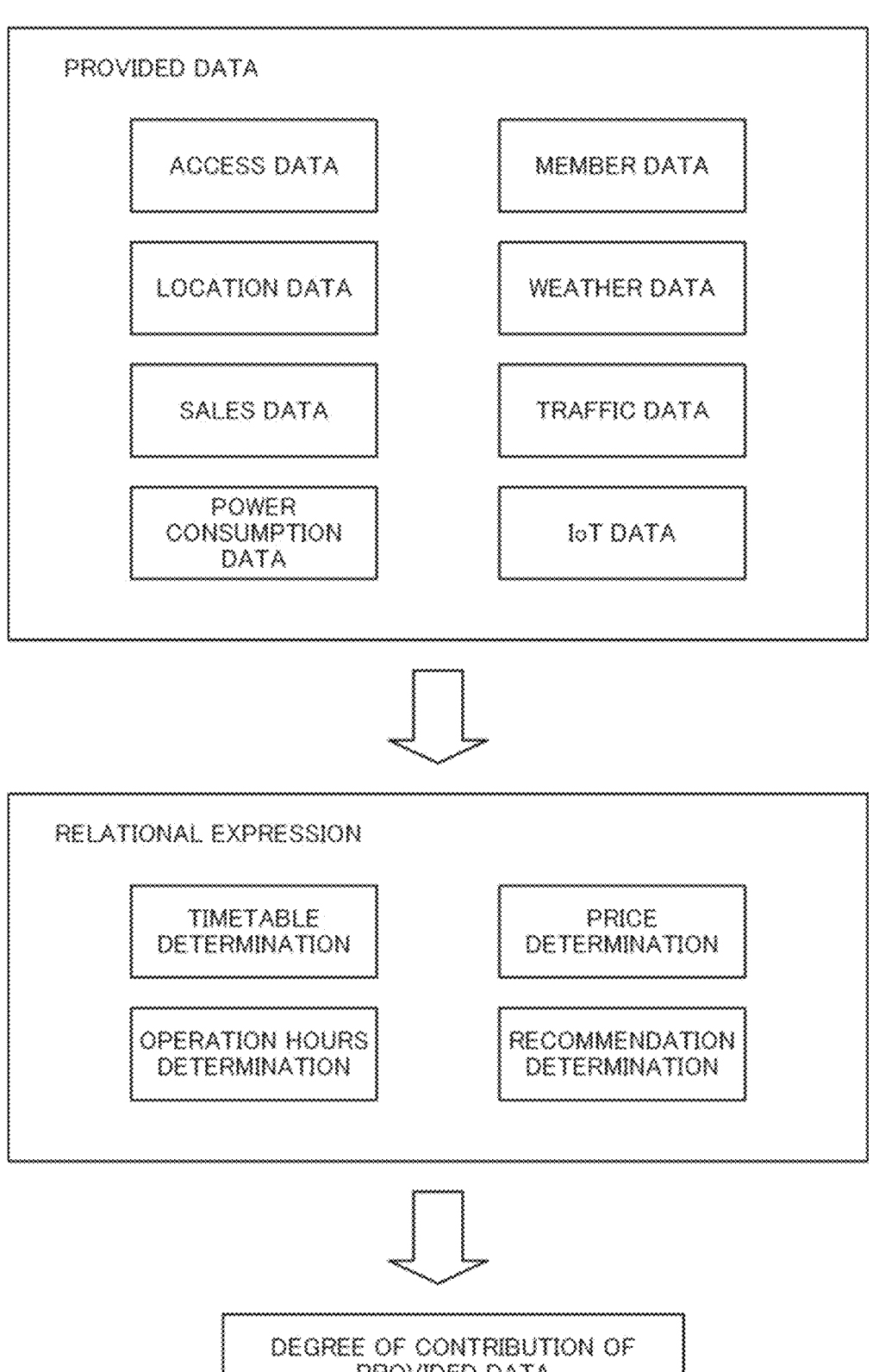
FIG. 3 is a view showing the state of processing by an information processing apparatus.
Figure 4:
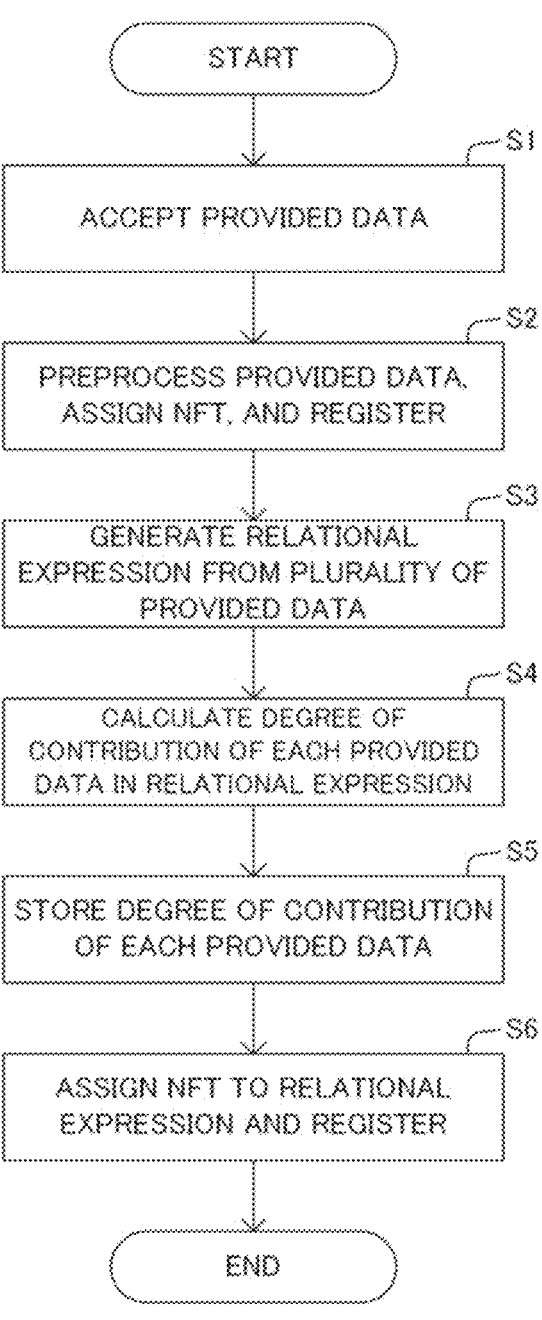
FIG. 4 is a flowchart showing the processing operation of the information processing apparatus.
Figure 5:
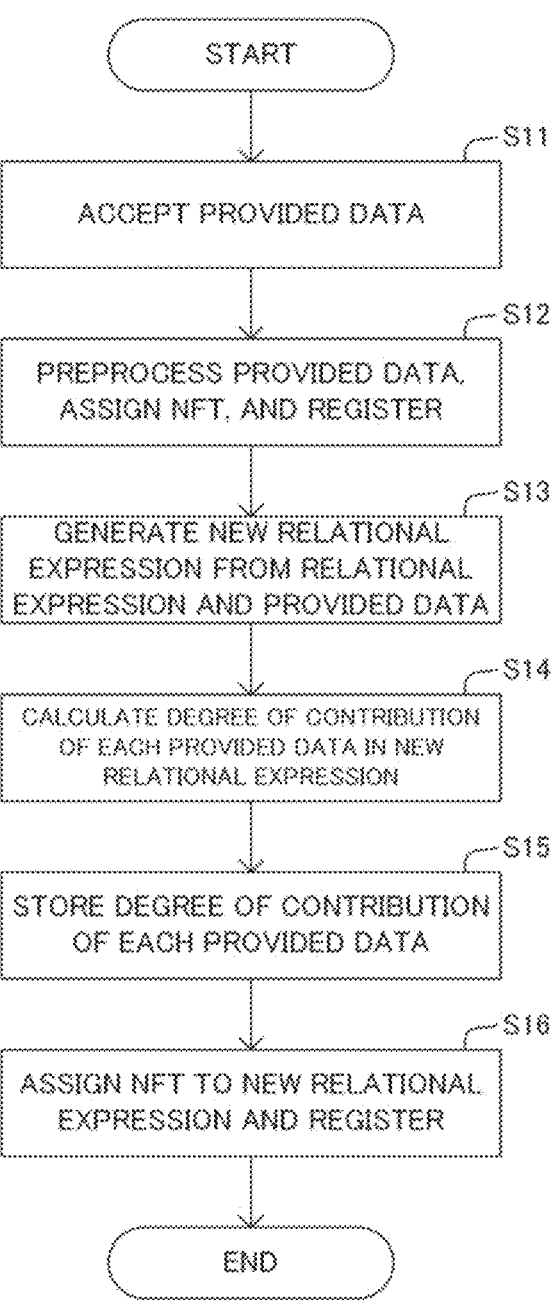
FIG. 5 is a flowchart showing the processing operation of the information processing apparatus.

The present disclosure will be described with reference to the drawings. FIGS. 1 and 2 are views for describing the configuration, and FIGS. 3 to 5 are views for describing the processing operation. The drawings may be associated in any of the example embodiments.

[Configuration]

An information processing system in this example embodiment is configured to, when analyzing provided data provided by business operators and generating data with new value based on the relation between the provided data, calculates the degrees of contribution of the respective provided data in the generated data. Then, by performing evaluation, for example, distributing considerations corresponding to the degrees of contribution to the business operators having provided the provided data, data distribution is promoted and the effective use of data is contemplated. At this time, by assigning NFTs (Non-Fungible Tokens) to the provided data and the generated data, the reliability of each of the data is secured, further data distribution is promoted, and the effective use of data is contemplated.

Here, the business operators that provide the provided data are business operators that do business together within a specific area A, for example, as shown in FIG. 1. As an example, the business operators include a railway business operator, an automobile business operator, a small-scale store business operator, and a large-scale store business operator. The provided data include, for example, as shown in FIG. 3, access data to predetermined data by a user using the service of the business operator, location data of the user, data of sales to the user by the business operator, power consumption data of the facility and equipment of the business operator, member data such as the attribute of a user registered as a member of the business operator, weather data and traffic data of the area A where the business operator provides the service, and IoT data including various data that can be acquired in the area A. The business type of the business operator may be any business type, and the provided data may be data with any content.

As shown in FIG. 1, each business operator performs analysis using a plurality of provided data among the various types of provided data as mentioned above, and generates generated data that is a relational expression with new value representing the relation between provided data to be used for contemplation of market expansion through overall optimization in the area A. For example, the relational expression outputs data increasing convenience for users in the area A and increasing sales of business operators. As an example, as shown in FIG. 3, the relational expressions are one that determines the timetable of vehicles operated by a business operator, one that determines the operation hours of equipment by a business operator, one that determines the provision prices of goods and services by a business operator, and one that determines recommendation by a business operator to users. However, the relational expressions are not limited to those described above, and may be a relational expression with any content.

FIG. 2 shows the overall configuration of the information processing system for realizing the above. The information processing system includes a plurality of business operator terminals 20 operated by the respective business operators described above and a management apparatus 10 connected to the business operator terminals 20 via a network.

The management apparatus 10 is configured with one or a plurality of information processing apparatuses each including an arithmetic logic unit and a memory unit. The management apparatus 10 includes a provided data registering unit 11, an analyzing unit 12, an evaluating unit 13, and a generated data registering unit 14 as shown in FIG. 2. The respective functions of the provided data registering unit 11, the analyzing unit 12, the evaluating unit 13, and the generated data registering unit 14 can be realized by the arithmetic logic unit executing a program stored in the memory unit for realizing the respective functions. The management apparatus 10 also includes a provided data storing unit 16 and a generated data storing unit 17. The provided data storing unit 16 and the generated data storing unit 17 are configured with the memory unit. Below, the respective components will be described in detail.

The provided data registering unit 11 acquires provided data from the business operator terminal 20 of a business operator providing the provided data, and stores the provided data into the provided data storing unit 16. Since business identification information for identifying a business operator and data acquisition time information are associated with the provided data provided from the business operator terminal 20, the provided data registering unit 11 then registers the provided data in association with these information. The provided data stored by the provided data registering unit 11 can be used only by a business operator that registers the management apparatus 10 to use as will be described later.

Further, the provided data registering unit 11 assigns an NFT (Non-Fungible Token) to the provided data and registers into the provided data storing unit 16. At this time, even for provided data with data contents of identical type, the provided data registering unit 11 assigns NFTs to the provided data acquired at different periods of time, respectively, and registers. Consequently, the provided data acquired at different periods of time are assigned NFTs and registered, respectively, as different provided data. For example, in a case where provided data is user location data, provided data acquired in a period of time from 9:00 to 12:00 and provided data acquired in a period of time from 12:00 to 15:00 on the same day are assigned NFTs, respectively, and then registered as different provided data. Therefore, every time new provided data is acquired and provided by a business operator, the provided data registering unit 11 registers as new provided data.

Meanwhile, the provided data registering unit 11 may perform preset preprocessing on provided data provided from the business operator terminal 20 and assign the preprocessed provided data an NFT and register. As the preprocessing, for example, conversion into a predetermined data format or data cleansing such as replenishment of missing data and error correction is performed.

Furthermore, the provided data registering unit 11 evaluates the quality of provided data according to the nature of the provided data and the processing condition of the preprocessing, and stores the provided data in association with an evaluation value corresponding to the evaluation result. For example, the provided data registering unit 11 evaluates provided data higher as a difficulty in acquisition is set to be high in the case of a data type for which it is set that the difficulty is high, evaluates provided data lower as the need for the preprocessing is higher because the provided data contains many losses and errors, and evaluates provided data higher in the case of a data type for which it is set that data accuracy increases by completion of execution of the preprocessing. The evaluation value stored in association with the provided data at this time is used later in calculation of the degree of contribution of the provided data.

Using a plurality of provided data stored in the provided data storing unit 16, the analyzing unit 12 (generating unit) generates a relational expression (generated data) between the provided data in response to an instruction from a certain business operator terminal 20. That is to say, in a case where a business operator considers whether data with new value can be generated using provided data of the business operator and provided data of another business operator, the business operator instructs specification of provided data to be used and the content of a relational expression to be generated. In response to this, the analyzing unit 12 reads out at least two provided data, analyzes the association between these provided data, and generates a relational expression corresponding to the relation. An example of the relational expression is as described above and, for example, a relational expression that outputs the optimal timetable of a vehicle operated by the business operator is generated. At this time, the analyzing unit 12 may generate, as the relational expression between a plurality of provided data, a decision tree for classifying or outputting optimal solution. As an example, the relational expression generated by the analyzing unit 12 could be a model generated to output data that increases convenience for users or increases sales for business operator in the area A by learning the relation between a plurality of provision data.

Further, the analyzing unit 12 may generate a new relational expression by using an already generated relational expression and other provided data different from provided data used in generation of the already generated relational expression. For example, in a case where there is a relational expression generated using first provided data and second provided data, the relational expression is updated using third provided data that has a data content of the same type as the first provided data but acquired in a different period of time from the first provided data. In this case, new relational expressions are generated between the first provided data and third provided data of the same type and the second provided data acquired in the same periods of time as the respective provided data.

Meanwhile, the abovementioned relational expression generation process by the analyzing unit 12 is not necessarily limited to being performed in the management apparatus 10, and may be executed in another information processing apparatus. For example, an information processing apparatus managed by each business operator may acquire provided data registered in the management apparatus 10, analyze the relation between the provided data, and generate a relational expression. The generated relational expression is acquired by the management apparatus 10.

The evaluating unit 13 (calculating unit) calculates the degree of association of each provided data in the relational expression generated as described above, that is, the degree of contribution of each provided data to the relational expression. For example, the evaluating unit 13 analyzes a parameter representing the association of the provided data included in the relational expression, and thereby calculates the degrees of contribution of the respective provided data used in generation of the relational expression. As an example, the evaluating unit 13 calculates the degree of contribution, which is the degree of association, higher for provided data as the weight of the provided data is set heavier in the relational expression or as the frequency of use of the provided data in the relational expression is higher. As another example, in a case where the degree of contribution of provided data in the generation of the relational expression by the analyzing unit 12 is large, the evaluating unit 13 calculates the degree of contribution of the provided data high. As described above, every time a new relational expression is generated, the evaluating unit 13 calculates the degree of contribution of used provided data based on the new relational expression.

In a case where provided data before analysis is associated with an evaluation value corresponding to the characteristic of the provided data, the evaluating unit 13 calculates the degree of contribution taking the evaluation value into consideration. For example, the evaluating unit 13 calculates the final degree of contribution by adding a value corresponding to the evaluation degree to the degree of contribution calculated based on the relational expression as described above.

The evaluating unit 13 stores the degree of contribution of each provided data calculated as described above into the provided data storing unit 16 in association with the corresponding provided data. Then, the stored degree of contribution associated with the provided data is used for distribution of profits and so forth to the business operators having provided the provided data. Meanwhile, the evaluating unit 13 may display, together with the generated relational expression, the degree of distribution of each provided data used in generation of the relational expression on a display device of an information processing apparatus such as the business operator terminal 20. That is to say, the evaluating unit 13 may visualize the degree of contribution of each provided data in the relational expression.

The generated data registering unit 14 assigns an NFT to the relation expression generated as described above and registers into the generated data storing unit 17. Every time a new relational expression is generated as described above, the evaluating unit 13 assigns an NFT to the new relational expression and registers. Moreover, the generated data registering unit 14 provides the relational expression with the NFT in response to a request from another information processing apparatus such as the business operator terminal 20.

[Operation]

Next, the operation of the above information processing system will be described. FIG. 3 shows the overview of the flow of data in the information processing system, and FIGS. 4 and 5 show the operation of the management apparatus 10.

First, each business operator provides the management apparatus 10 with provided data from the business operator terminal 20. For example, the business operator provides the management apparatus 10 with provided data such as access data, location data, sales data, power consumption data, member data, weather data, traffic data and IoT data as shown in FIG. 3. The management apparatus 10 accepts the provided data provided by the business operator (step S1 in FIG. 4) and stores the provided data into the provided data storing unit 16. At this time, the management apparatus 10 performs preset preprocessing on the provided data, and assigns an NFT to the preprocessed provided data and registers (step S2 in FIG. 4). The management apparatus 10 performs, as the preprocessing, conversion into a predetermined data format, and data cleansing such as replenishment of missing data and error correction, for example.

Every time accepting provided data from the business operator terminal 20, the management apparatus 10 performs preprocessing and assignment of NFT on each provided data and registers. Therefore, in the management apparatus 10, provided data with data content of identical type acquired at different periods of time are assigned NFTs as different provided data and registered.

Furthermore, at this time, the management apparatus 10 evaluates the quality of the provided data according to the nature of the provided data and the processing condition of the preprocessing, associates the evaluated value with the provided data, and stores. The evaluation value is used later in calculating the degree of contribution of the provided data.

Assume a case where the business operator then considers whether data with new value can be generated using the provided data of the business operator and provided data of another business operator. In this case, the business operator specifies provided data to be used and the content of a relational expression to be generated and instructs the management apparatus 10 through the business operator terminal 20 to perform data analysis. In response to this, the management apparatus 10 reads at least two provided data, analyzes the association between these provided data, and generates a relational expression (step S3 in FIG. 4). The relational expression to be generated is one that outputs data increasing convenience for users and increasing sales for the business operator in the region A. For example, as shown in FIG. 3, the relational expression can be one that determines the timetable of a vehicle operated by the business operator, one that determines the operation hours of equipment by the business operator, one that determines the offering prices of goods and services by the business operator, and one that determines the content of recommendation by the business operator to users. The relational expression generation process may be performed by another information processing apparatus.

Subsequently, the management apparatus 10 calculates the degree of association of each of the provided data in the relational expression generated as described above, that is, the degree of contribution of each of the provided data to the relational expression (step S4 in FIG. 4). For example, the evaluating unit 13 analyzes a parameter included by the relational expression, and thereby calculates the degree of contribution of each of the provided data used in generation of the relational expression. Then, the management apparatus 10 associates the calculated degree of contribution with the corresponding provided data, and stores into the provided data storing unit 16 (step S5 in FIG. 4). At this time, in a case where an evaluation value corresponding to the characteristic of the provided data is associated, the management apparatus 10 adds the evaluation value to calculate the final degree of contribution and stores. In many cases, even for identical data, the quantified degree of contribution may vary in accordance with the setting of a period of time to be analyzed, and it is possible to simultaneously realize clarification of characteristic contribution to a specific area over a short period of time and clarification of a contribution to the whole over a long period of time. The timing of the evaluation can be determined by agreement between business operators that provide data.

After that, the management apparatus 10 assigns an NFT to the relational expression generated as described above and registers into the generated data storing unit 17 (step S6 in FIG. 4). Then, the management apparatus 10 provides another information processing apparatus with the degree of contribution associated with each provided data and the relational expression as necessary.

As described above, provided data provided by the respective business operators are associated with the degrees of contribution to a relational expression generated using the provided data. Therefore, it is possible to quantify the degrees of contribution to the business operators having provided the provided data. By using these degrees of contribution, it is possible to fairly distribute rewards such as profits obtained by using a relational expression with new value to the business operators. As a result, data distribution is promoted, data can be used effectively, and a business operator can expand business and sales.

Further, since provided data and a relational expression are assigned NFTs and registered, the reliability of such data is ensured, data distribution is further promoted, and data can be used more effectively.

Next, the operation in the case of further generating a new relational expression using an already generated relational expression will be described. First, when new provided data is provided to the management apparatus 10 from each business operator, the management apparatus 10 accepts the provided data provided by the business operator (step S11 in FIG. 5), and stores into the provided data storing unit 16. Then, the management apparatus 10 performs preset preprocessing on the provided data, assigns an NFT to the preprocessed provided data, and registers (step S12 in FIG. 5).

Assume a case where the business operator then considers whether it is possible to data with even new value can be generated using newly provided data of the business operator or another business operator and the existing relational expression. In this case, the business operator specifies provided data and relational expression to be used, and instructs the management apparatus 10 through the business operator terminal 20 to perform further analysis. In response to this, the management apparatus 10 reads out at least one new provided data and a relational expression, analyzes the association between the new provided data and provided data incorporated in the relational expression, and generates a new relational expression. (Step S13 in FIG. 5). Meanwhile, the relational expression generation process may be performed by another information processing apparatus.

Subsequently, the management apparatus 10 calculates the degrees of association of the respective provided data in the new relational expression generated as described above, that is, the degrees of contribution of the respective provided data to the relational expression (step S14 in FIG. 5). Then, the management apparatus 10 associates the calculated degree of contribution with the corresponding provided data and stores into the provided data storing unit 16 (step S15 in FIG. 5). After that, the management apparatus 10 assigns an NFT to the generated new relation expression and registers into the generated data storing unit 17 (step S16 in FIG. 5). Then, the management apparatus 10 provides another information processing apparatus with the degree of contribution associated with each provided data and the relational expression.

As described above, there is a possibility that a new relational expression is generated every time each business operator provides provided data, data distribution is promoted, data can be effectively used, and business and sales of the business operator can be expanded. Moreover, since new provided data and relational expression are assigned NFTs at all times, the reliability of the data is secured, data distribution is more promoted, and data can be more effectively used.

Second Example Embodiment

Figure 6:
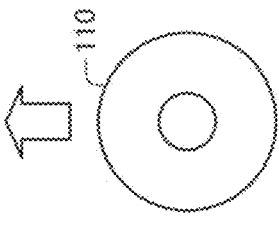
FIG. 6 is a block diagram showing the hardware configuration of an information processing apparatus according to the present disclosure.
Figure 7:
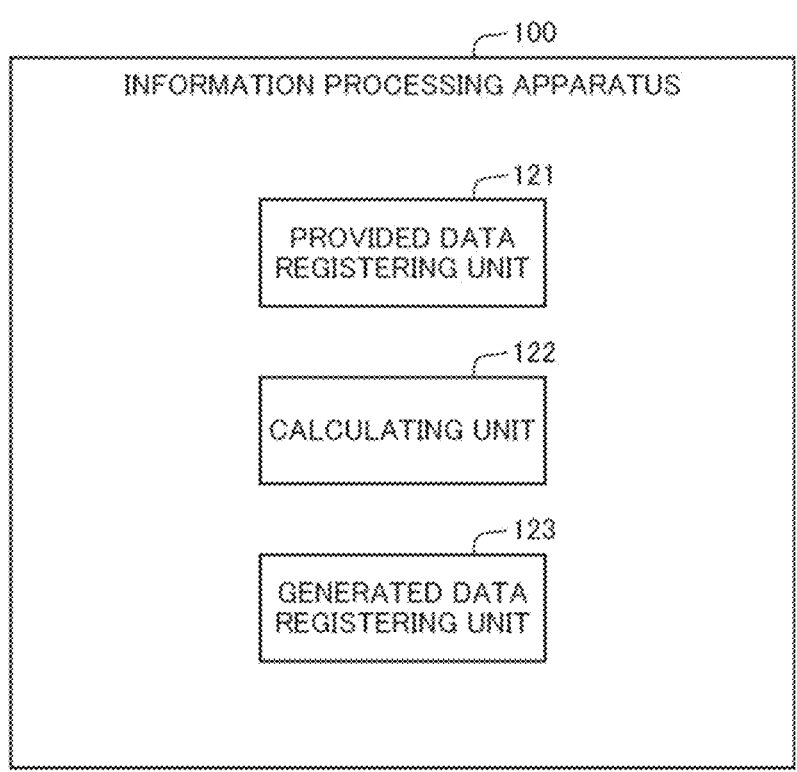
FIG. 7 is a block diagram showing the configuration of the information processing apparatus according to the present disclosure.

Next, a second example embodiment of the present disclosure will be described with reference to the drawings. In this example embodiment, the overview of the configuration of the management apparatus described in the above example embodiment is shown. FIGS. 6 and 7 are views for describing the configuration, and these drawings can be associated with any of the example embodiments.

First, the hardware configuration of an information processing apparatus 100 will be described with reference to FIG. 6. The information processing apparatus 100 is configured with a general information processing apparatus and, as an example, has the following hardware configuration including;

- a CPU (Central Processing Unit) 101 (arithmetic logic unit),
- a ROM (Read Only Memory) 102 (memory unit),
- a RAM (Random Access Memory) 103 (memory unit),
- programs 104 loaded to the RAM 103,
- a storage device 105 storing the programs 104,
- a drive device 106 performing reading from and writing into a storage medium 110 outside the information processing apparatus,
- a communication interface 107 connecting with a communication network 111 outside the information processing apparatus,
- an input/output interface 108 performing input/output of data, and
- a bus 109 connecting the respective components.

FIG. 6 shows an example of the hardware configuration of the information processing apparatus serving as the information processing apparatus 100, and the hardware configuration of the information processing apparatus is not limited to the abovementioned case. For example, the information processing apparatus may be configured with part of the abovementioned configuration, such as without the drive device 106. Moreover, the information processing apparatus can use, instead of the abovementioned CPU, a GPU (Graphic Processing Unit), a DSP (Digital Signal Processor), an MPU (Micro Processing Unit), an FPU (Floating point number Processing Unit), a PPU (Physics Processing Unit), a TPU (Tensor Processing Unit), a quantum processor, a microcontroller, or a combination thereof.

Then, the information processing apparatus 100 can construct and include a provided data registering unit 121, a calculating unit 122, and a generated data registering unit 123 shown in FIG. 7 by acquisition and execution of the programs 104 by the CPU 101. The programs 104 are, for example, stored in advance in the storage device 105 or the ROM 102 and loaded to the RAM 103 and executed by the CPU 101 as needed. Also, the programs 104 may be supplied to the CPU 101 via the communication network 111, or the programs 104 may be stored in the storage medium 110 in advance and read out by the drive device 106 and supplied to the CPU 101. However, the provided data registering unit 121, the calculating unit 122, and the generated data registering unit 123 described above may be constructed of dedicated electronic circuits for realizing such means.

The provided data registering unit 121 registers provided data assigned an NFT (Non-Fungible Token). The calculating unit 122 calculates the degree of association of each of a plurality of provided data in generated data generated using the plurality of provided data. The generated data registering unit 123 assigns an NFT to the generated data and registers.

According to the present disclosure, with the configuration as described above, generated data is generated using provided data, and the degree of association of the provided data in the generated data is calculated. Thus, it is possible to quantify the degree of contribution of provided data in generated data, and it becomes possible to fairly distribute rewards for the provided data. As a result, data distribution is promoted, and data can be effectively used. Moreover, since provided data and generated data are assigned NFTs and registered, the reliability of such data is secured, data distribution is more promoted, and data can be more effectively used.

Meanwhile, at least one or more of the functions of the provided data registering unit 121, the calculating unit 122, and the generated data registering unit 123 described above may be executed by an information processing apparatus that is installed at any place on the network and connected, that is, may be executed on the so-called cloud computing.

Further, the abovementioned program can be stored using various types of non-transitory computer-readable mediums and supplied to a computer. The non-transitory computer-readable mediums include various types of tangible storage mediums. Examples of the non-transitory computer-readable mediums include a magnetic recording medium (e.g., a flexible disk, a magnetic tape, a hard disk drive), a magneto-optical recording medium (e.g., a magneto-optical disk), a CD-ROM (Read Only Memory), a CD-R, a CD-R/W, and a semiconductor memory (e.g., a mask ROM, a PROM (Programmable ROM), an EPROM (Erasable PROM), a flash ROM, a RAM (Random Access Memory)). The program may also be provided to a computer by various types of transitory computer-readable mediums. Examples of the transitory computer-readable mediums include an electric signal, an optical signal, and an electromagnetic wave. The transitory computer-readable medium can provide the program to a computer via a wired communication channel such as an electric wire and an optical fiber, or via a wireless communication channel.

Although the present disclosure has been described above with reference to the example embodiments, the present disclosure is not limited to the above example embodiments. The configuration and details of the present disclosure can be changed in various manners that can be understood by one skilled in the art within the scope of the present disclosure. Then, each of the example embodiments can be combined with the other example embodiment as needed.

<Supplementary Notes>

The whole or part of the example embodiments disclosed above can be described as the following supplementary notes. Below, the overview of the configurations of an information processing apparatus, an information processing method, and a program in the present disclosure will be described. However, the present disclosure is not limited to the following configurations.

(Supplementary Note 1)

An information processing apparatus comprising:

a provided data registering unit that registers provided data assigned an NFT (Non-Fungible Token);

a calculating unit that calculates a degree of association of each of a plurality of provided data in generated data generated using the plurality of provided data; and a generated data registering unit that assigns an NFT to the generated data and registers.

(Supplementary Note 2)

The information processing apparatus according to Supplementary Note 1, wherein the calculating unit calculates a degree of association of each of a plurality of provided data in the generated data representing a relational expression between the plurality of provided data, based on the relational expression.

(Supplementary Note 3)

The information processing apparatus according to Supplementary Note 2, wherein the calculating unit calculates a degree of association of each of a plurality of provided data in the generated data representing the relational expression generated to obtain a preset output using the plurality of provided data, based on the relational expression.

(Supplementary Note 4)

The information processing apparatus according to Supplementary Note 2 or 3, comprising a generating unit that generates the generated data representing the relational expression between the plurality of provided data using the plurality of provided data.

(Supplementary Note 5)

The information processing apparatus according to Supplementary Note 4, wherein:

the generating unit generates a new relational expression using the relational expression that is the generated data having been generated and other provided data that is different from the provided data used in generating the relational expression; and the generated data registering unit assigns an NFT to the generated data that is the new relational expression and registers.

(Supplementary Note 6)

The information processing apparatus according to Supplementary Note 5, wherein the provided data registering unit assigns an NFT to each of the plurality of provided data with data content of identical type having been acquired in different periods of time, and registers as the provided data different from each other.

(Supplementary Note 7)

The information processing apparatus according to any of Supplementary Notes 1 to 6, wherein the provided data registering unit assigns an NFT and registers after performing preset preprocessing on the provided data.

(Supplementary Note 8)

The information processing apparatus according to any of Supplementary Notes 1 to 7, wherein the calculating unit calculates a new degree of association based on an evaluation value of the provided data corresponding to a preset characteristic of the provided data and the degree of association.

(Supplementary Note 9)

An information processing method comprising:

registering provided data assigned an NFT (Non-Fungible Token);

calculating a degree of association of each of a plurality of provided data in generated data generated using the plurality of provided data; and assigning an NFT to the generated data and registering.

(Supplementary Note 9.1)

The information processing method according to Supplementary Note 9, comprising calculating a degree of association of each of a plurality of provided data in the generated data representing a relational expression between the plurality of provided data, based on the relational expression.

(Supplementary Note 9.2)

The information processing method according to Supplementary Note 9.1, comprising generating the generated data representing the relational expression between the plurality of provided data using the plurality of provided data.

(Supplementary Note 9.3)

The information processing method according to Supplementary Note 9.2, comprising:

generating a new relational expression using the relational expression that is the generated data having been generated and other provided data that is different from the provided data used in generating the relational expression; and assigning an NFT to the generated data that is the new relational expression and registering.

(Supplementary Note 9.4)

The information processing method according to any of Supplementary Notes 9 to 9.3, comprising assigning an NFT and registering after performing preset preprocessing on the provided data.

(Supplementary Note 9.5)

The information processing method according to any of Supplementary Notes 9 to 9.4, comprising calculating a new degree of association based on an evaluation value of the provided data corresponding to a preset characteristic of the provided data and the degree of association.

(Supplementary Note 10)

A computer program comprising instructions for causing a computer to realize processes to:

register provided data assigned an NFT (Non-Fungible Token);

calculate a degree of association of each of a plurality of provided data in generated data generated using the plurality of provided data; and assign an NFT to the generated data and register.

DESCRIPTION OF REFERENCE NUMERALS 10 management apparatus
11 provided data registering unit
12 analyzing unit
13 evaluating unit
14 generated data registering unit
16 provided data storing unit
17 generated data storing unit
20 business operator terminal
100 information processing apparatus
101 CPU
102 ROM
103 RAM
104 programs
105 storage device
106 drive device
107 communication interface
108 input/output interface
109 bus
110 storage medium
111 communication network
121 provided data registering unit
122 calculating unit
123 generated data registering unit

The invention claimed is:

1. An information processing apparatus comprising:
at least one memory storing processing instructions; and
at least one hardware processor configured to execute the processing instructions, and cause the at least one hardware processor to:
accept provided data from one or more external terminals connected, through a communication network, to the information processing apparatus;
perform preset preprocessing on the provided data, assign an NFT (Non-Fungible Token) to the preprocessed provided data, and register the preprocessed provided data with the assigned NFT;
calculate a degree of association of each of a plurality of provided data in generated data generated using the plurality of provided data;
calculate a new degree of association based on an evaluation value of the provided data corresponding to a preset characteristic of the provided data and the degree of association; and
assign a new NFT to the generated data and register the generated data.

2. The information processing apparatus according to claim 1, wherein the at least one hardware processor is configured to execute the processing instructions to calculate the degree of association of each of the plurality of provided data in the generated data representing a relational expression between the plurality of provided data, based on the relational expression.

3. The information processing apparatus according to claim 2, wherein the at least one hardware processor is configured to execute the processing instructions to calculate the degree of association of each of the plurality of provided data in the generated data representing the relational expression generated to obtain a preset output using the plurality of provided data, based on the relational expression.

4. The information processing apparatus according to claim 2, wherein the at least one hardware processor is configured to execute the processing instructions to generate the generated data representing the relational expression between the plurality of provided data using the plurality of provided data.

5. The information processing apparatus according to claim 4, wherein the at least one hardware processor is configured to execute the processing instructions to: generate a new relational expression using the relational expression that is the generated data having been generated and other provided data that is different from the provided data used in generating the relational expression; and assign a different NFT to the generated data that is the new relational expression and register the generated data.

6. The information processing apparatus according to claim 5, wherein the at least one hardware processor is configured to execute the processing instructions to assign a new different NFT to each of the plurality of provided data with data content of identical type having been acquired in different periods of time, and register as the provided data different from each other.

7. An information processing method, being implemented by a hardware of an information processing apparatus, the method comprising:

accepting, by the hardware, provided data from one or more external terminals connected to the information processing apparatus through a communication network;

performing preset preprocessing on the provided data, assigning an NFT (Non-Fungible Token) to the preprocessed provided data, and registering the preprocessed provided data with the assigned NFT;

calculating a degree of association of each of a plurality of provided data in generated data generated using the plurality of provided data;

calculating, by the hardware, a new degree of association based on an evaluation value of the provided data corresponding to a preset characteristic of the provided data and the degree of association; and assigning a new NFT to the generated data and registering the generated data.

8. The information processing method according to claim 7, further comprising: calculating the degree of association of each of the plurality of provided data in the generated data representing a relational expression between the plurality of provided data, based on the relational expression.

9. The information processing method according to claim 8, further comprising: generating the generated data representing the relational expression between the plurality of provided data using the plurality of provided data.

10. The information processing method according to claim 9, further comprising: generating a new relational expression using the relational expression that is the generated data having been generated and other provided data that is different from the provided data used in generating the relational expression; and assigning a different NFT to the generated data that is the new relational expression and registering the generated data.

11. A non-transitory computer-readable storage medium in which a computer program is stored, the program comprising instructions for causing a hardware of an information processing apparatus to execute processes to:

accept provided data from one or more external terminals connected, through a communication network, to the information processing apparatus;

perform preset preprocessing on the provided data, assign an NFT (Non-Fungible Token) to the preprocessed provided data, and register the preprocessed provided data with the assigned NFT;

calculate a degree of association of each of a plurality of provided data in generated data generated using the plurality of provided data;

calculate a new degree of association based on an evaluation value of the provided data corresponding to a preset characteristic of the provided data and the degree of association; and assign a new NFT to the generated data and register the generated data.

* * * * *